Feb. 25, 1936.                     J. E. ALM                      2,031,582
       CONVERSION OF ALTERNATING CURRENTS INTO DIRECT CURRENT OR VICE VERSA
                     Filed Feb. 10, 1934         10 Sheets-Sheet 1

INVENTOR
Johan Emil Alm
BY Wm. T. Hedlund
his ATTORNEY

Feb. 25, 1936.  J. E. ALM  2,031,582
CONVERSION OF ALTERNATING CURRENTS INTO DIRECT CURRENT OR VICE VERSA
Filed Feb. 10, 1934  10 Sheets-Sheet 3

*Fig. 10.*

INVENTOR
Johan Emil Alm
BY
his ATTORNEY

Feb. 25, 1936.    J. E. ALM    2,031,582
CONVERSION OF ALTERNATING CURRENTS INTO DIRECT CURRENT OR VICE VERSA
Filed Feb. 10, 1934    10 Sheets-Sheet 4

INVENTOR
Johan Emil Alm
BY
Wm J. Hedlund
his ATTORNEY

Feb. 25, 1936.   J. E. ALM   2,031,582
CONVERSION OF ALTERNATING CURRENTS INTO DIRECT CURRENT OR VICE VERSA
Filed Feb. 10, 1934   10 Sheets-Sheet 5

INVENTOR
Johan Emil Alm
BY
W. J. Hedlund
his ATTORNEY

Feb. 25, 1936.    J. E. ALM    2,031,582
CONVERSION OF ALTERNATING CURRENTS INTO DIRECT CURRENT OR VICE VERSA
Filed Feb. 10, 1934    10 Sheets-Sheet 8

*Fig. 19.*

INVENTOR
Johan Emil Alm
BY
Wm J. Hedlund
his ATTORNEY

Feb. 25, 1936.    J. E. ALM    2,031,582
CONVERSION OF ALTERNATING CURRENTS INTO DIRECT CURRENT OR VICE VERSA
Filed Feb. 10, 1934    10 Sheets-Sheet 9

*Fig. 20.*

INVENTOR
Johan Emil Alm
BY
Wm J. Hedlund
his ATTORNEY

Feb. 25, 1936.  J. E. ALM  2,031,582
CONVERSION OF ALTERNATING CURRENTS INTO DIRECT CURRENT OR VICE VERSA
Filed Feb. 10, 1934  10 Sheets-Sheet 10

Fig. 21.

INVENTOR
Johan Emil Alm
BY
W. J. Hedlund
his ATTORNEY

Patented Feb. 25, 1936

2,031,582

UNITED STATES PATENT OFFICE 2,031,582

CONVERSION OF ALTERNATING CURRENTS INTO DIRECT CURRENT OR VICE VERSA

Johan Emil Alm, Stockholm, Sweden, assignor to Baltzar Carl von Platen, Stockholm, Sweden Application February 10, 1934, Serial No. 710,704
In Sweden July 12, 1933

23 Claims. (Cl. 175—364)

The problem to convert two-phase or polyphase alternating currents, particularly three phase currents, into direct current or vice versa has long since been considered very important in the art. The solution most commonly known of this problem is the ordinary rotary converter of the single armature type in which alternating currents are supplied to the armature winding through slip rings and, upon rectification in an ordinary commutator, delivered in the form of direct current at the output terminals of the converter. Such a machine is quite reliable for converting currents of moderate voltage and amperage. The highest voltage or amperage for which such a converter may be commercially designed is limited by the commutator. At higher voltages the number of segments must be made very great to reduce voltage between segments and thus the danger of sparking is incurred. When the voltage reaches a value of some 10,000 volts or more it becomes impossible with the present teaching of the art to construct a reliable commutator of ordinary design.

Some other conversion methods are, however, also known. Inter alia, the method of Haynes disclosed in the U. S. Patent 661,719 may be mentioned according to which the alternating current phases are each included between consecutive segments in a commutator adapted to rectify the alternating voltages impressed upon the segments, the different commutators being then series connected whereby the different rectified voltage impulses are superposed to give a resulting direct voltage having a nearly constant amplitude. As the alternating potential supplied to the commutators is sinusoidal this method has, however, the disadvantage that there are no definite zero voltage intervals during which a sparkless commutation may take place.

The present invention has for its object to eliminate said disadvantages and to render possible the conversion of sinusoidal alternating currents to direct current even at very high voltages and/or amperages without making the commutator device too bulky or of impractical dimensions while avoiding undesirable sparking. In accordance with the invention, each alternating phase voltage is superposed upon an auxiliary alternating voltage of such a wave form that the resulting alternating phase voltage, so far as possible, obtains definite zero voltage intervals between adjacent voltage periods, not only at no load but also when under load, and the phase voltages thus obtained are rectified individually and composed to produce a direct voltage.

The invention will be more closely described in the following with reference to the accompanying drawings, further features of the invention being then also set forth.

On the drawings, Figure 11 is a rectified diagram of a pole pitch whereas

Figure 1:
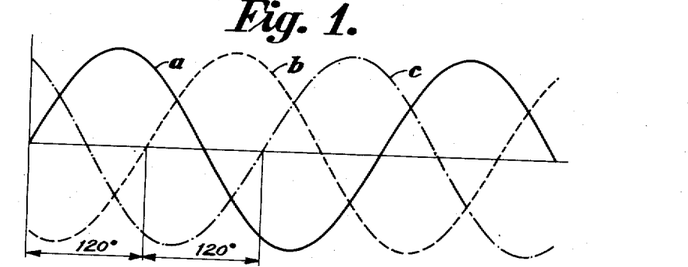
Figures 1 to 5 show certain wave forms of general interest.
Figure 2:
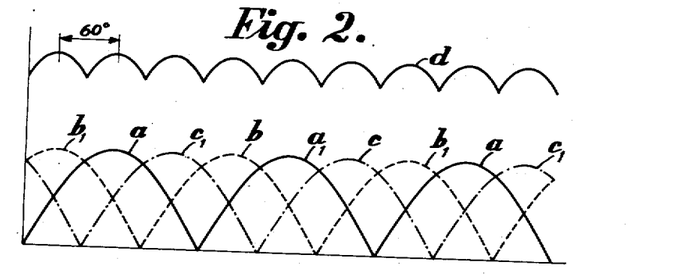

In Figure 1 is shown a voltage diagram for sinusoidal three phase alternating current with phases $a$, $b$ and $c$. The phase voltages are in known manner mutually displaced in phase 120 electrical degrees. If it were possible to rectify all the negative half waves of the voltages the diagram of Figure 2 would, at least theoretically, be obtained in which $a_1$, $b_1$, $c_1$ designate the reversed negative half waves of the appertaining phase voltages. If said rectified impulses are added in the manner disclosed by Haynes the curve $d$, Figure 2, is obtained which has a superposed ripple voltage of a frequency six times that of the original curve. As already stated in the preamble it is, however, not possible in practice to reproduce such curves as there are no definite zero voltage intervals for the commutation between consecutive voltage periods, such as occurs in curves $a$ and $a_1$ As the commutator brushes necessary for the reversal of the voltage and current waves must have a certain peripheral width, a portion of the voltage wave will be short-circuited adjacent to the zero point of the wave whereby the curvature of the wave is deformed and a tendency of sparking arises.

Figure 3:
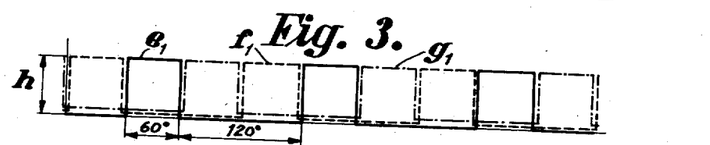

In order to better explain the invention certain desiderata regarding the wave form of the rectified voltage impulses will be stated. In Figure 3 such impulses of rectangular form appertaining to three different phases $e_1$, $f_1$ and $g_1$ are indicated. The duration of each voltage impulse is here sixty electrical degrees or, in general, 180 degrees divided by the number of phases $$\left(\frac{180°}{m}\right).$$

If the different voltages are mutually superposed, a direct voltage having a constant amplitude $h$ is obtained. In the space between consecutive voltage waves there are considerable zero voltage intervals having a duration of 120 electrical degrees or, in general, $$180\frac{m-1}{m}$$

electrical degrees. It goes without saying that in this case the capacity of the voltage generating members is not utilized to an economical degree whereas, on the other hand, the zero voltage intervals are longer than is necessary.

Figure 4:
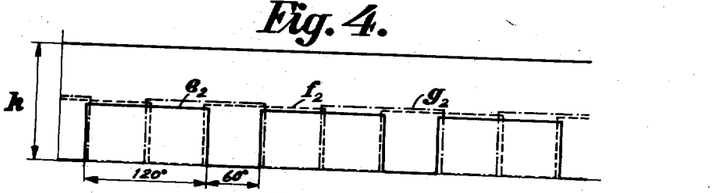
Figure 5:
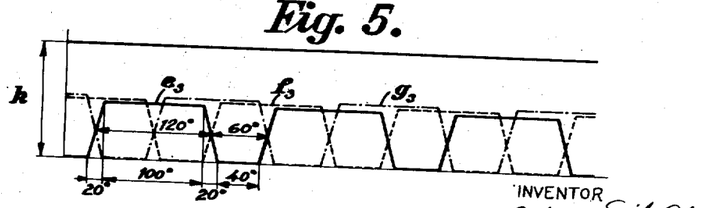

In order to better utilize the capacity of the voltage generating members it is possible, as is shown in Figure 4, to have the voltage waves of the three phases $e_2$, $f_2$ and $g_2$ of double length or 120 electrical degrees corresponding to $$2\frac{180}{m}$$

degrees or, in general, $$n\frac{180}{m}$$

degrees, in which $n$ is an integer less than $m$, in which case only 60 electrical degrees or, in general, $$\frac{180(m-n)}{m}$$

degrees remain for the zero voltage intervals. If such voltages are superposed a direct potential of an amplitude $k$ equal to $2h$ or, in general, equal to $nh$ is obtained. Without the voltage generating members having to deliver a higher voltage the resulting direct voltage will be twice as high as in the former case in a three phase system having the number $n=2$. In practice it is, however, very difficult to produce purely rectangular wave forms for which reason it is preferable to use the trapezoidal form shown in Figure 5, or a similar wave form for the rectified phase voltages $e_3$, $f_3$ and $g_3$. According to this figure each trapezoid has an average length of 120 electrical degrees, but has a sloping portion extending twenty degrees, in which case the top portion of the wave will have an extent of $120-20=100$ electrical degrees and the zero voltage interval an extent of $60-20=40$ electrical degrees. Also, in this case an amplitude $k$ of the resulting direct voltage is obtained through superposition, which voltage has a substantially constant amplitude, provided the voltage impulses either have exact trapezoidal shape or have periods of constant amplitude limited by S-shaped transition curves symmetric about a horizontal line at a distance from the neutral line equal to half the amplitude of the wave. Provided the extent of the transition curve is $\gamma$ electrical degrees the extent of the wave top is $$\frac{180 \cdot n}{N} - \gamma$$

electrical degrees and the extent of the zero voltage interval $$\frac{180(m-n)}{m} - \gamma$$

degrees. The extent of the transition curve must accordingly be less than $$\frac{180(n-m)}{m}$$

degrees.

Figure 6:
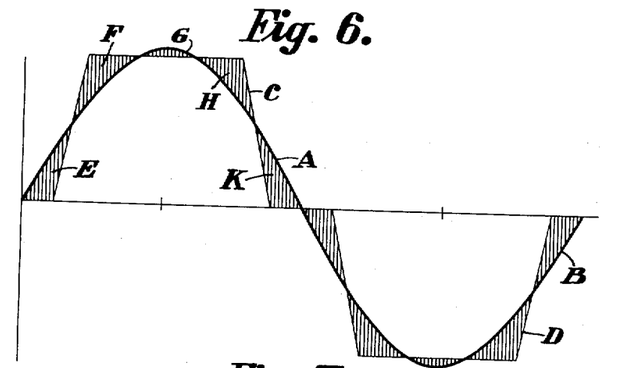
Figures 6, 7, 8, and 9 illustrate the inventive idea in a three phase system.

If we start with a sinusoidal curve A, B, as is shown in Figure 6, and wish to deform this curve so as to obtain a trapezoidal voltage curve C, D, an alternating voltage must apparently be superposed on the voltage A, B. Provided the surface of the wave in both phases has to remain the same, this auxiliary voltage must have a negative interval corresponding to the surface E followed by a positive interval F, a negative interval G, a positive interval H, and a negative interval K. A fully symmetrical auxiliary voltage, but having an opposite sign, must be superposed on the negative half wave B to obtain the trapezoid D.

Figure 8:
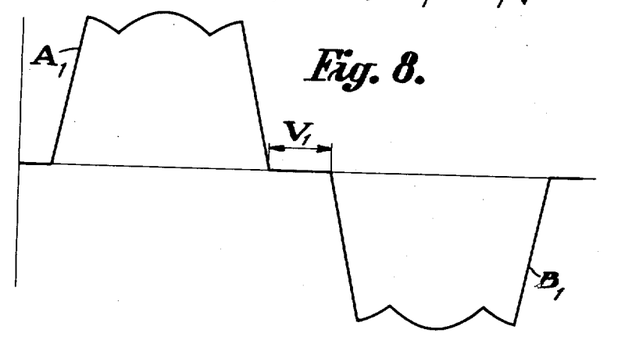
Figure 9:
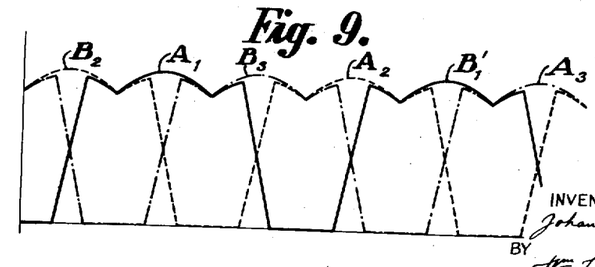

In practice, however, certain difficulties are met in producing exactly the required alternating voltage E, F, G, H, K. However, a quite satisfactory approximation may be obtained through the auxiliary alternating voltage shown in Figure 7 extending through 360 electrical degrees and comprising the negative portions L, O, $M_1$ and $N_1$ and the positive portions M, N, $L_1$ and $O_1$. If such a curve is superposed on the sinusoidal curve A, B in Figure 6 the resulting curve $A_1$, $B_1$ shown in Figure 8 is obtained. This curve conforms quite closely with the desired trapezoid with the exception of a few small deviations at the top of the trapezoid. If such a trapezoidal alternating voltage is rectified the curve $A_1$, $B_1'$, shown in Figure 9, is obtained. If all the three phases in this manner carry a nearly trapezoidal alternating voltage, which is rectified in each phase individually, the curves $A_2$, $B_2$ and $A_3$, $B_3$ are obtained. Through superposition of these voltages a resulting direct voltage is obtained having about double the amplitude of the original. This direct voltage includes a certain ripple alternating voltage of a frequency six times that of the original voltage so that the lowest instantaneous value of the direct voltage will deviate about thirteen percent from the highest direct potential. By using two series-connected three phase groups having a mutual phase displacement of thirty electrical degrees instead of a single three phase group the greatest deviation may, however, be reduced to about four percent. If the number of three phase groups is further increased the greatest deviation in the voltage from the ideal direct voltage will be reduced approximately quadratically with the increase in the number of such groups. There is no principal objection against providing the plant with any number of series-connected three phase groups, but from practical considerations one, or at most two, groups may be found most convenient in which case the corresponding ripples in the direct voltage will have to be tolerated.

Figure 10:
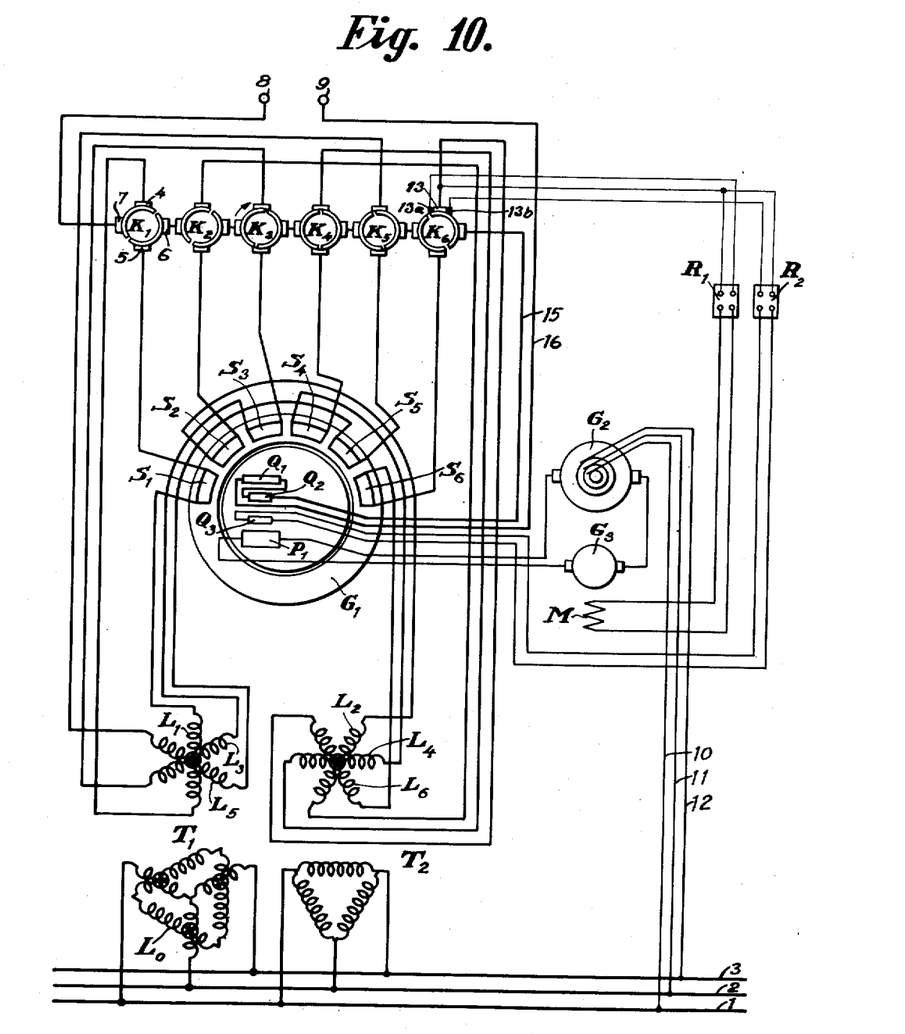
Figure 10 shows one embodiment of the invention.

In the embodiment shown in Figure 10 having two series-connected three phase groups, the sinusoidal three phase alternating voltage is supplied from the mains 1, 2, 3. To said mains two transformers $T_1$, $T_2$ are connected. The primary windings of the transformer $T_1$ are star connected, whereas the primary windings of the transformer $T_2$ are delta connected. In this manner the desired phase displacements of thirty degrees between the two secondary systems is obtained according to principles known in the art. The transformer $T_1$ is further provided with an additional delta connected winding $L_0$ the function of which shall be explained in the following. The secondary windings of the transformers are designated $L_1$ to $L_6$, the indices of the reference characters relating to the mutual phase positions of the windings. The different windings are electrically separated from one another and are apparently displaced mutually thirty electrical degrees.

The six secondary windings are, in accordance with their phase order, each associated with one armature winding $S_1$ to $S_6$ of a synchronous machine $G_1$ which, in the shown embodiment for the sake of simplicity, is assumed to be of bipolar type although as will be shown in the following it is preferable, in view of the type of commutators here used, to provide the machine with a number of poles which is a multiple of four. The phase displacement between consecutive phases is only thirty electrical degrees. This machine has for its object to induce an auxiliary alternating voltage in its armature windings, for instance of V-form according to Figure 7. It should be noted that with the wave form shown, by way of example in Figure 7, the resulting effect to be delivered by the machine $G_1$ will be purely reactive provided the amperage is substantially constant and the surface of the positive voltage waves M, N agrees with the surface of the negative voltage waves L, O. At a constant amplitude of the current, that is, the delivered direct current being constant, the different voltage waves will give the same effect but each time with a different sign. No active energy is accordingly required to keep the machine $G_1$ running and only friction and other no load losses will have to be overcome by the driving motor which preferably may consist of a so called autosynchronous motor directly fed from the mains 1, 2, 3. The fact that the load of the driving motor is independent of the direct current load may in certain cases be of considerable importance.

The secondary circuits further include each a commutator $K_1$ to $K_6$, the mutual arrangement of which commutators may be similar to that illustrated in Figure 10 of the French Patent 754,149. Each commutator comprises two segments of which those belonging to different commutators are mutually displaced an angle of thirty electrical degrees. As each revolution of the commutator causes four short-circuits said angle corresponds to fifteen mechanical degrees. The short-circuits caused by the brushes in the different commutators will be out of phase in accordance with the mutual phase angles of the windings $L_1$ to $L_6$. In case the machine $G_1$ is of bipolar type the commutators must rotate at one half the speed of the armature of the machine. For this reason it will be found most practical for a two segment commutator to design the machine with four poles, or rather four pole members, so that the commutator may be directly coupled to the armature shaft. In a four segment commutator the pole number should be eight, in a six segment commutator twelve, etcetera. At right angles to a brush pair 4, 5 of the commutator $K_1$, another brush pair 6, 7 is provided from which the rectified voltage impulses are derived. The other commutators are disposed in similar manner and series-connected so that a rectified voltage may be derived from the terminals 8, 9.

Figure 7:
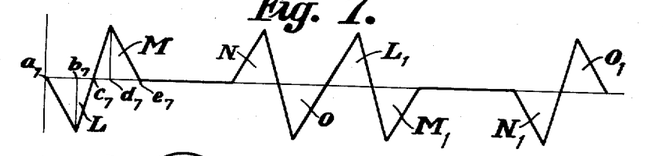

As is seen from Figure 7, four voltage waves must be induced in the synchronous machine G for each half period, of which waves the adjacent ones, such as N, O, $L_1$, $M_1$, preferably are induced by the same pole member. The induced auxiliary alternating voltages should further be induced during that part of the period when the phase alternating voltage is varying from its positive to its negative amplitude or vice versa. During those intervals when the phase voltage varies in the neighbourhood of its maximum amplitude the auxiliary alternating voltages should, however, be equal to zero. From this fact is understood that the pole members in the machine $G_1$ should be so synchronized in relation to the phase voltage that the coil sides of an arbitrary phase coincides with the centre of a pole member at a moment falling right between two consecutive maximum points of the phase voltage. This condition further emphasizes the fact that the energy delivered by the machine is purely reactive. The pole members are provided with such an excitation winding $P_1$ that the auxiliary voltages, on the one hand, as far as possible obtain the desired shape, and, on the other, become proportional to the prevailing phase voltage. To comply with the first of said two requirements the excitation winding $P_1$ should be disposed according to certain rules laid down in the following in another connection. To comply with the second requirement the excitation winding $P_1$ is preferably fed from a rotary converter $G_2$, the alternating current side of which is fed through the line 10, 11, 12 directly from the mains 1, 2, 3. To correct deviations in the excitation, due to, among other things, the heating of the conductors, an auxiliary generator $G_3$ may be included in the direct current circuit of the rotary converter $G_2$. The excitation winding M of said auxiliary generator is controlled by a relay $R_1$. This relay may be designed, by way of example, in the manner disclosed in the French Patent 723,082. The relay is in turn connected, by way of example, between one of the brushes 13 of the commutator $K_6$ and an auxiliary brush 13a disposed close to the leading edge of the brush 13. If the excitation is not quite correct the zero voltage interval $V_1$ shown in Figure 8 will not be fully developed so that an impulse occurs between the main and auxiliary brushes 13, 13a at the beginning of the commutation interval. This impulse is equalized and amplified in the relay $R_1$ so that a direct current in the one or the other direction is caused to flow in the winding M. In this manner an electromotive force is induced in the armature of the generator $G_3$ which is superposed on the voltage delivered by the converter $G_2$, whereby the excitation of the machine $G_1$ is increased or decreased according to circumstances.

Further, the pole members should preferably be provided with a compensation winding $Q_1$, the magnetic axis of which falls at the centre of the pole member and the magnetomotive force of which is proportional to the load and equal to but opposite the magnetomotive force caused by the armature winding. To cause this feeding proportional to the load the compensation winding $Q_1$ is preferably connected by the line 15, 16 in series with the direct current circuit 8, 9.

As the current in the different phase windings, on account of the self-induction of the circuits, does not reverse voluntarily, an auxiliary commutation voltage must be introduced during the commutating period in each phase, for which purpose the poles are provided with a special commutation winding $Q_2$. The magnetic action of this winding must fall under the zero voltage interval and hence its magnetic axis should coincide with the centre of the pole member. To cause a commutation voltage proportional to the amperage, the winding $Q_2$ is included in series with the winding $Q_1$ in the direct current circuit 8, 9 of the machine. Should, however, the commutation not be entirely exact, that is, should the current at the end of the commutating period not have reversed completely and assumed the same value as before the commutation but with opposite direction, there will be a tendency for sparking to occur at the trailing brush edges. Upon this phenomenon may be based a correction means comprising an auxiliary commutation winding $Q_3$ controlled by the relay $R_2$, preferably similar to the relay $R_1$. The relay $R_2$ is connected between the brush 13 and an auxiliary brush 13b disposed close to the trailing edge of the brush 13.

It has been proved in practice, however, that in machines of smaller sizes a quite satisfactory operation is obtained without the two relays $R_1$, $R_2$ and the auxiliary means $G_3$ and $Q_3$ controlled thereby and such relays in many cases may be omitted.

Figure 11:
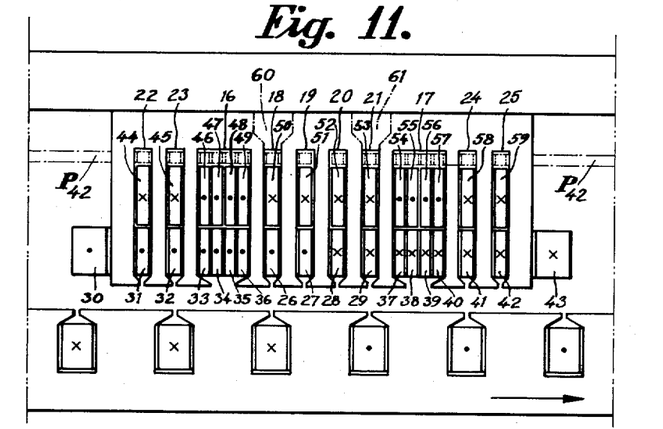
Figure 12:
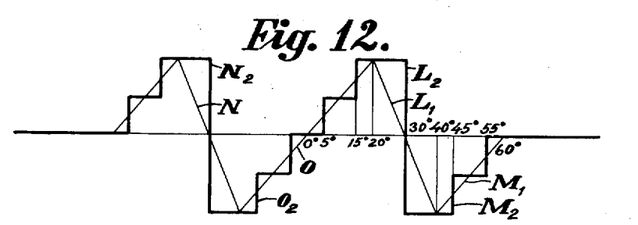
Figures 12 and 13 show certain curves related thereto.
Figure 13:
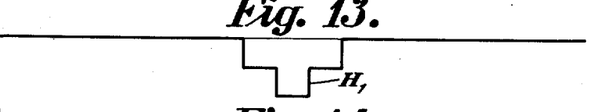
Figure 14:
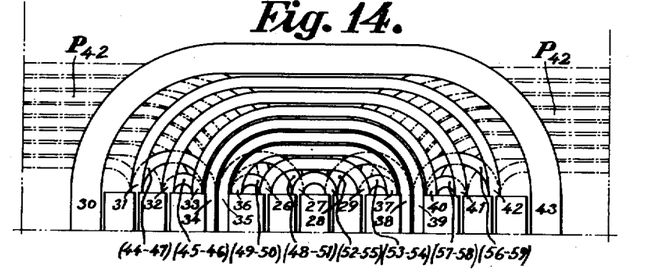
Figure 14 shows diagrammatically the arrangement of Figure 11 as viewed from within the armature.

The design of a pole member is shown in Figure 11 extending over a pole pitch or 180 electrical degrees corresponding to the distance between two consecutive positive and negative maxima in the alternating voltage curve for each phase. In Figure 14 the pole member of Figure 11 is viewed from below in order to clearly show the disposition of the conductors. The pole member is here adapted for an inclination $\gamma$ of the trapezoidal phase voltage curve corresponding to twenty electrical degrees. In this case the distance $a1$ to $b1$ in Figure 7 should be twenty degrees, the distance $b1$ to $c1 = c1$ to $d1 =$ ten degrees and the distance $d1$ to $e1$ equal to twenty degrees. If a stepped curve according to Figure 12 is accepted as the closest practical approximation to the broken line of voltage or magnetomotive force, respectively, in Figure 7 the following disposition is conceivable. Two wide slots 16 and 17 are provided on opposite sides of the center of the pole member and at a distance therefrom of thirty electrical degrees. Between said slots there are provided four considerably narrower slots spaced apart ten electrical degrees, that is, being five and fifteen electrical degrees, respectively, from, and on either side of, the central line of the pole member. Outside the wide slots 16 and 17 there are further four narrow slots 22, 23, 24, 25 symmetrically distributed, as is shown in Figure 11, at a distance of forty-five and fifty-five electrical degrees, respectively, from the central line of the pole members. The conductor groups 26, 27, 28, 29 (in certain cases only 27 and 29) constitute here the commutation winding $Q_2$ (or only a part thereof in which latter case the remainder of the winding $Q_2$ is disposed in the spaces 60, 61). The relative current direction in said conductors may be seen from Figure 11, a point designating a current flowing towards the eye and a cross designating a current flowing away from the eye. The compensation winding $Q_1$ comprises the conductors or conductor groups 30 to 43. The current direction in said groups is designated in the same manner as above with points and crosses. The generator disposition of the conductors is illustrated in Figure 14. The magnetomotive force $H_1$ caused by the commutation winding 26, 29 and 27, 28 is illustrated in Figure 13. If only the conductor group 26, 29 is used the curve $H_1$ will be purely rectangular. The commutation voltage caused hereby must of course fall under the short-circuit period. The magnetic axes both of the commutation winding and of the compensation winding must coincide with the center of the pole member.

The magnet winding proper $P_1$ comprises four different groups. One group comprises conductors or conductor groups 44, 47 and 45, 46 having a magnetic axis in the described example at a distance of 42.5 and 37.5 degrees from the center of the pole member. The next group comprises the conductor or conductor groups 48, 51 and 49, 50 the magnetic axes of which in the shown example fall on 17.5 and 22.5 degrees from the center of the pole member. The second pole half comprises two groups symmetrical herewith or the conductors or conductor groups 52, 55 and 53, 54 and further 56, 59 and 57, 58 the magnetic axes of which fall symmetrically in relation to the two first mentioned groups. The magnetomotive force caused by the magnet winding $P_1$ is diagrammatically shown in Figure 12. The MMF curve has a stepped positive portion $N_2$, a negative portion $O_2$, a positive portion $L_2$, and finally a negative portion $M_2$. The portions $N$, $O$, $L_1$ and $M_1$ of the curve in Figure 7 are for the sake of comparison drawn in fine lines in Figure 12. It is seen from the figure that the obtained magnetomotive force conforms comparatively closely to the desired curve. It should further be noted that in practice there will be no sharp transitions between the different curve portions and the deviations will in fact be less than shown on the drawings. It is further possible to obtain an equalization by disposing the armature slots at an angle to the pole slots.

In case an adjusting winding $Q_3$ is required for the commutation this winding, together with that portion of the commutation winding $Q_2$ not accommodated below in the slots 26, 29, may be inserted, for instance in special spaces 60 and 61 shown on the drawings in dot and dash lines.

Figure 15:
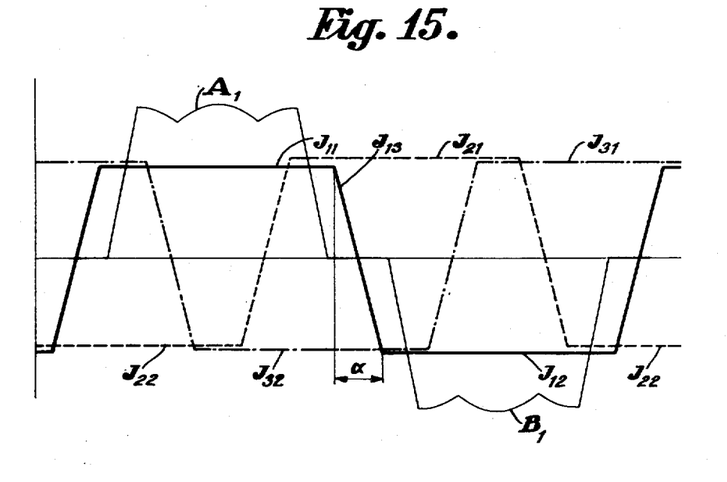
Figures 15 and 16 show certain curves.
Figure 16:
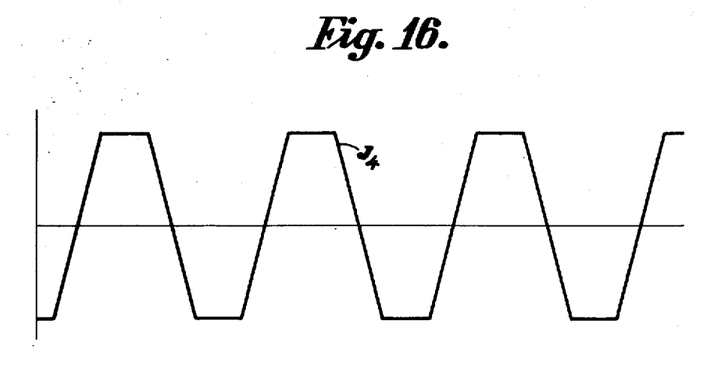

In explanation of the object of the special winding $L_0$ provided on the star connected transformer the following facts should be noted. As is understood from Figure 10, the current passing through, for instance, the winding circuit 5, $S_1$, $L_1$, 4 must be exactly equal to the main direct current in the circuit 8, 7, 6, 9 in all positions of the commutator, with the exception of those angular positions in which any one of the brushes 4, 5, 6 or 7 causes a short-circuit of the two segments, thus permitting current to pass directly between the brushes 6, 7 without having to pass through the winding circuit. According to Figure 15, the phase current will comprise a horizontal positive portion $J_{11}$ and a negative horizontal portion $J_{12}$. Through a distance $\alpha$, corresponding to the short-circuit interval, the current is assumed to reverse according to the curve $J_{13}$ according to the principle of the so-called rectilinear commutation. To facilitate the identification the waves $A_1$ and $B_1$ of the phase voltage are also drawn. The conditions mentioned concern phase $L_1$. In phase $L_5$ the current is displaced according to the curve $J_{21}$, $J_{22}$ and in the phase $L_3$ according to the curve $J_{31}$, $J_{32}$. In ordinary transformers where the current is sinusoidal, as shown in the diagram in Figure 1, the sum of the different phase currents is always equal to zero. As, however, the currents according to Figure 15 are not sinusoidal and do not have such other form that the sum of the phase currents is zero, a resulting current $J_4$, Figure 16, is obtained when adding the instantaneous amplitudes of the currents. The resulting current pulsates with a triple frequency. In a star connected system without neutral wire the sum of the currents must, however, always be zero, or in other words, the current $J_4$ cannot develop there. In order to avoid disturbances in the transformer $T_1$ due thereto either the neutral point of the primary side may be connected to the neutral point of the mains or, if such a point is not accessible, a winding $L_0$ may be provided through which equalizing currents may pass.

If the desired direct voltage is so high that the machine $G_1$ in Figure 10 may not advantageously be designed directly for this voltage the machine $G_1$ may be designed for low voltage whereas the auxiliary voltages are introduced by means of transformers in those high tension circuits, through the commutation of which the high tension direct current is obtained. This idea may be reduced to practice in several different embodiments.

In accordance with one of these, the voltage of the three phase mains is first transformed to an amplitude suitable for the auxiliary machine, the desired conversion of the phase number taking place simultaneously. After the auxiliary machine has converted the sinusoidal voltage curve to trapezoidal form having finite zero voltage intervals, the voltage thus converted is transformed up to the required amplitude, whereupon it is rectified by means of the high tension commutator. As is shown in Figure 17, the primaries of two transformers $T_3$ and $T_4$, carrying the entire converted power, are connected in series with the secondaries of transformers $T_1$ and $T_2$, respectively, and the armature windings.

Figure 20:
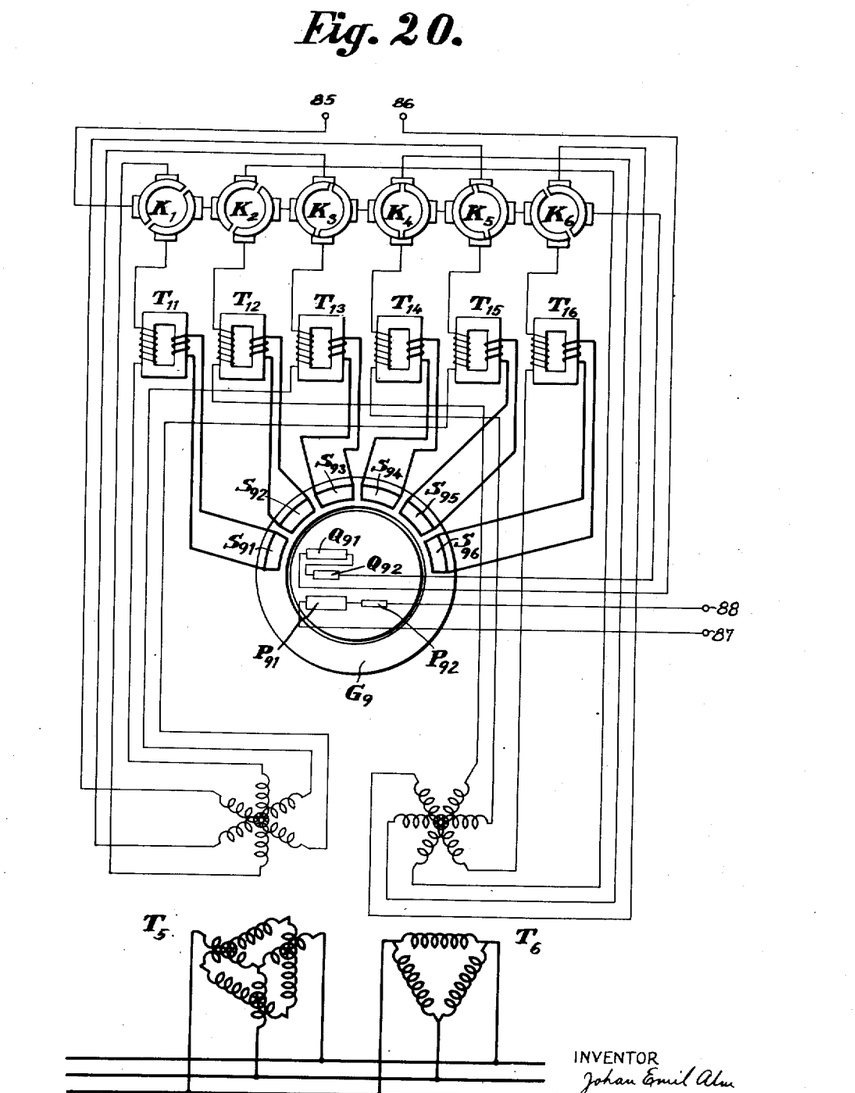

In accordance with another embodiment, the transformers $T_1$ and $T_2$ in Figure 10 may be designed to produce a secondary voltage corresponding to the rectified voltage, and the high tension auxiliary voltage introduced into the different phases by means of transformers, the secondary winding of which are connected in series with said phases whereas the primary windings are associated with the terminals of the low tension auxiliary machine, as shown in Figure 20. Said transformers need only be rated for a power corresponding to the size of the auxiliary machine and accordingly as a rule may be smaller than in the preceding case.

Figure 17:
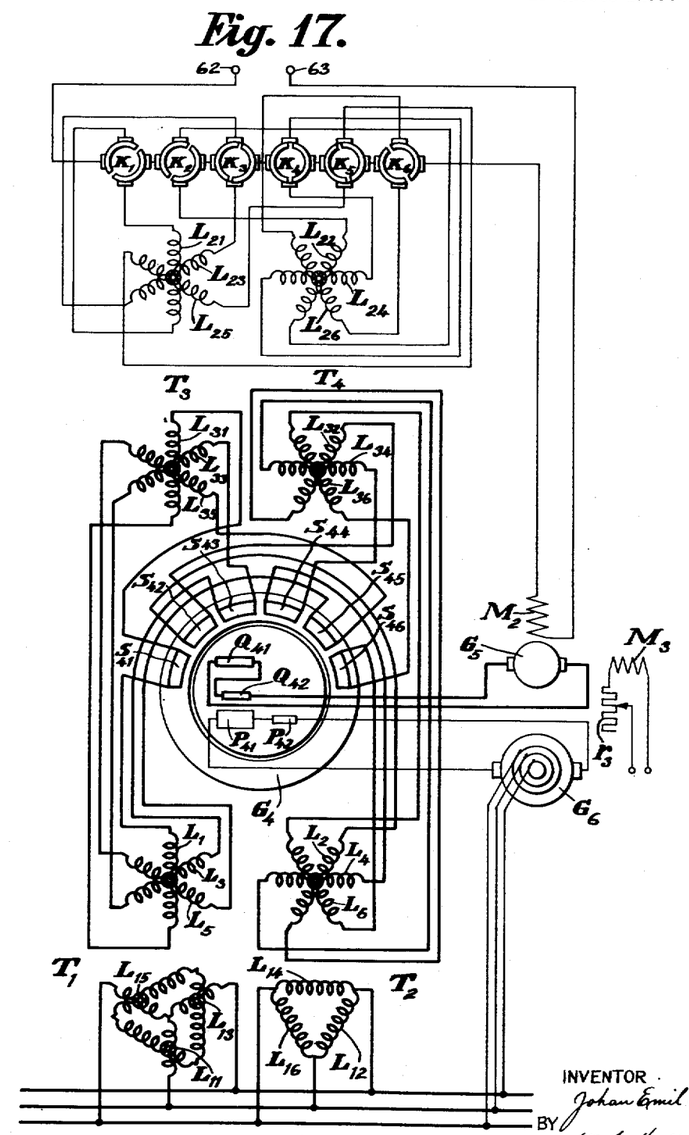
Figures 17 to 21 show other embodiments of the invention.

In Figure 17 the phase windings $S_{41}$ to $S_{46}$ of the machine $G_4$ are, in the correct phase order, connected to the primary windings $L_{31}$ to $L_{36}$ of the transformers $T_3$ and $T_4$. The secondary windings $L_{21}$ to $L_{26}$ of said transformers are connected to the commutators $K_1$ to $K_6$ in the manner described above in connection with Figure 10. Otherwise, similar principles are observed as in Figure 10 with certain already mentioned exceptions caused by the higher direct voltage and by the existance of the excitation currents of the transformers $T_3$ and $T_4$. At a high direct voltage the high tension direct current may not conveniently be used for feeding the compensation and commutation windings in the machine $G_4$ but a low tension direct current proportional thereto must be used. To generate this low tension direct current and to establish its proportionality to the high tension load current several embodiments are conceivable. A special direct current machine $G_5$ may be provided which is excited either directly by the high tension direct current or through the intermedium of voltage impulses derived between a main brush and an auxiliary brush at the trailing edge of the former and thereupon duly equalized and amplified. In case the machine $G_5$ is energized by the high tension direct current its speed must, of course, be constant. The generator $G_5$ is preferably further provided with a separately fed auxiliary excitation winding $M_3$, the current of which is adjustable by means of the resistance $r_3$. In addition to the excitation winding $P_{41}$ there is also provided an auxiliary excitation winding $P_{42}$ having for its object to compensate for that part of the magnetomotive forces of the armature windings $S_{41}$ to $S_{46}$ which is caused by the excitation currents of the transformers $T_3$ and $T_4$. The magnetic axis of this winding should apparently be displaced ninety electrical degrees in relation to the central axis of the pole member and is therefore arranged, by way of example, as shown in Figures 11 and 14 with dot and dash lines. As the excitation current depends upon the impressed voltage the winding $P_{42}$ is preferably series connected with the excitation winding proper $P_{41}$ fed from the rotary converter $G_6$.

Also in this case special adjusting windings controlled by relays may, of course, be provided as described in connection with Figure 10.

Figure 18:
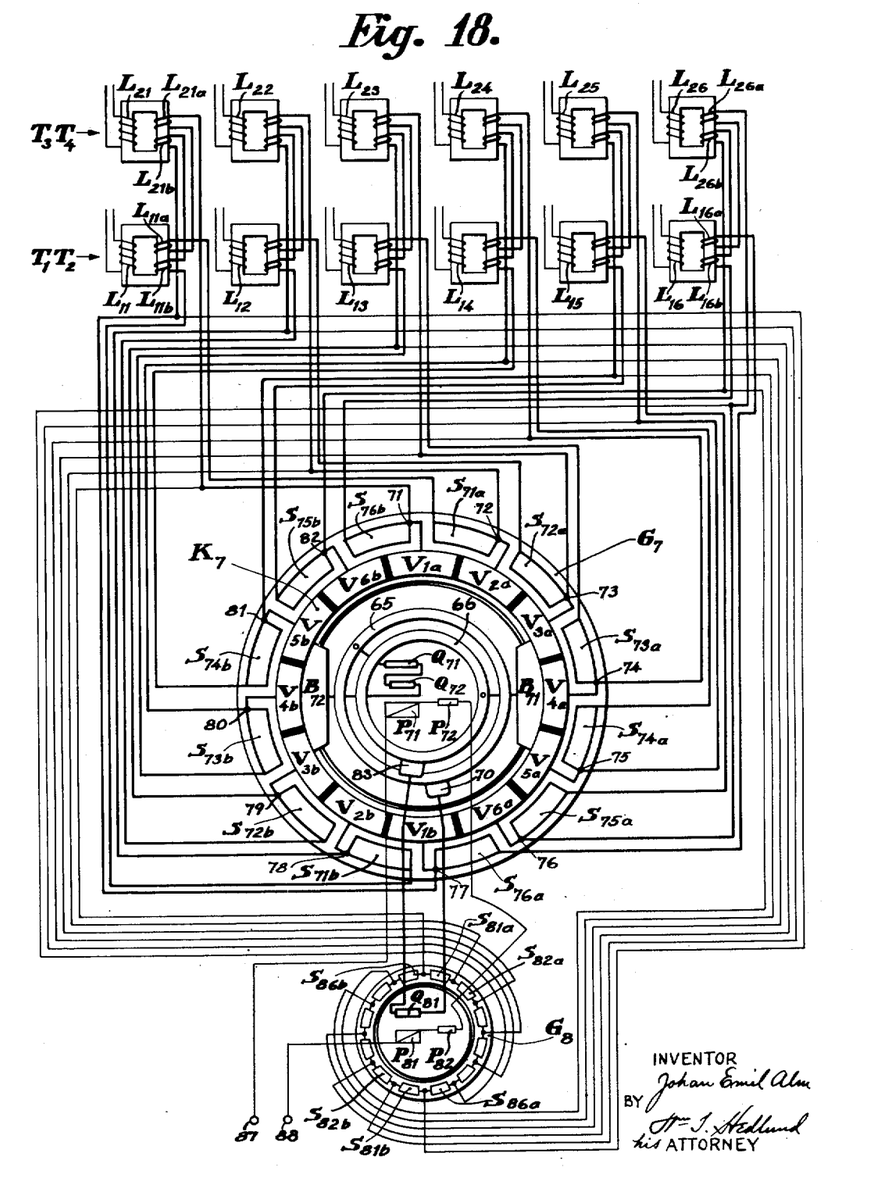

In Figure 18 of the present application a circuit arrangement is shown for deriving direct current from the low tension circuit of the transformers. This arrangement is similar to that shown in Figure 17, the generator $G_7$ corresponding to the generator $G_4$ in Figure 17. Each phase winding $S_{41}$ to $S_{46}$ is, however, subdivided into two phase winding parts mutually displaced 180 electrical degrees so that twelve phases $S_{71a}$ to $S_{76a}$ and $S_{71b}$ to $S_{76b}$ are obtained in the generator $G_7$, of which phases those having index $a$ are diametrically opposite to, or 180 electrical degrees out of phase in relation to, the phases having index $b$ and the same numerical reference. The windings $L_{11}$ to $L_{16}$ in Figure 17 may be identified with the same designations in Figure 18, they being shown here as six single phase transformers. In similar manner the secondary windings $L_{21}$ to $L_{26}$ of the step up transformers are to be found in Figure 18. On the other hand, the secondary windings $L_1$ to $L_6$ of Figure 17 of the first transformer group are in Figure 18 subdivided into two halves $L_{11a}$ to $L_{16a}$ and $L_{11b}$ to $L_{16b}$. Also, the primary windings $L_{31}$ to $L_{36}$ of the step up transformers of Figure 17 are subdivided in Figure 18 into two halves $L_{31a}$ to $L_{36a}$ and $L_{31b}$ to $L_{36b}$. Further the excitation windings $P_{71}$ and $P_{72}$ of the generator $G_7$ are separately fed, as are the windings $P_{41}$ and $P_{42}$ in Figure 17, for instance from the terminals 87, 88 of a rotary converter not shown on the drawings. The compensation winding $Q_{71}$ and the commutation winding $Q_{72}$ are fed by direct current from a commutator $K_7$ the design of which will be more specifically described in the following and which is entirely separate from the high tension direct current circuit including the windings $L_{21}$ to $L_{26}$.

Figure 19:
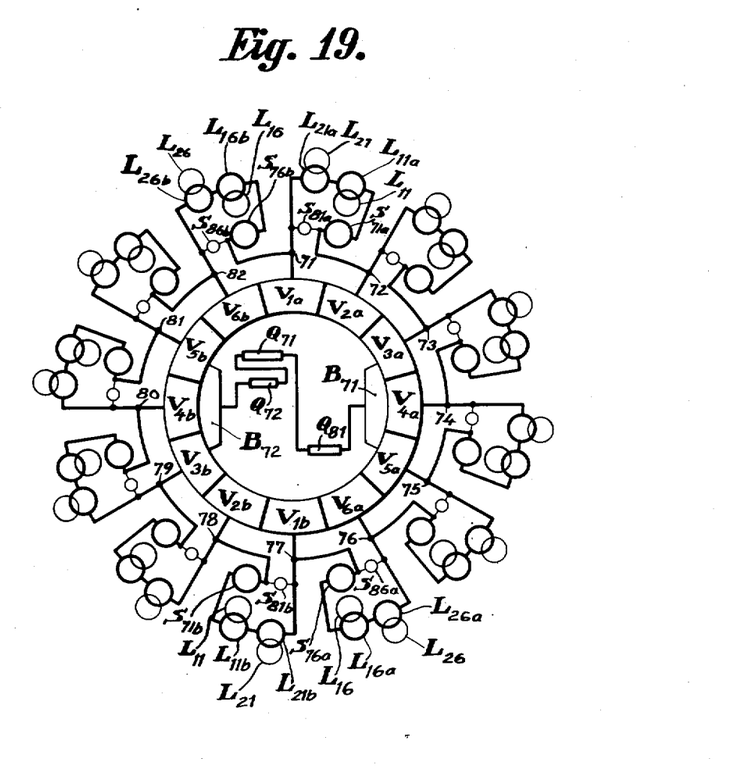

In a bipolar machine the commutator $K_7$ is provided with twelve segments $V_{1a}$ to $V_{6a}$ and $V_{1b}$ to $V_{6b}$. Said segments may preferably be stationary whereas the brushes $B_{71}$ and $B_{72}$ co-operating therewith rotate. The brushes are connected with the windings $Q_{71}$, $Q_{72}$ rotating with the brushes. As is seen from Figure 18, a current path between two consecutive commutator segments, such as $V_{1a}$ and $V_{2a}$, may be traced over two transformer windings $L_{21a}$ and $L_{11a}$, an armature winding $S_{71a}$, and back to the next segment $V_{2a}$ of the commutator $K_7$. The segments $V_{1b}$ and $V_{2b}$ corresponding to the above mentioned segments but out of phase 180 electrical degrees in relation thereto are interconnected over a current path including the transformer windings $L_{21b}$ and $L_{11b}$, which two windings are reversed in relation to the windings $L_{21a}$ and $L_{11a}$, further through the armature winding $S_{71b}$ of the generator $G_7$, and back to the segment $V_{2b}$ of the commutator $K_7$. It is further evident that this entire winding system is closed at the points 71 to 82 whereby a so called loop or mesh connection is obtained, the general properties of which are easily understood from the simplified diagram in Figure 19 showing the different segment circuits or "coils". It is, however, evident that the armature windings of the generator $G_7$ do not carry only those auxiliary voltages which are necessary to make the wave form of the phase alternating voltages trapezoidal and those load currents which correspond to a certain load, but also the excitation currents of the transformers $T_3$, $T_4$. In order not to require a different setting of the brushes $B_{71}$, $B_{72}$ at no load and at load it is therefore preferable to connect into circuit a so called compensating generator $G_8$, the different armature windings $S_{81a}$ to $S_{86a}$ and $S_{81b}$ to $S_{86b}$ of which are in due order connected across the corresponding segments of the commutator $K_7$. This compensating generator may be designed in such a manner that it neutralizes the excitation components from the alternating currents supplied to the commutator $K_7$. These conditions are clearly explained in my copending application Serial No. 710,703 filed on the 10th day of February 1934. Consequently, the alternating currents supplied to the commutator $K_7$ will be free from said components and the direct current passing the windings $Q_{71}$, $Q_{72}$ proportional to the load components of the phase alternating currents. To absorb the excitation currents of the transformers at no load the voltage drop in the phase windings $S_{81a}$ et cetera, caused by the excitation currents of the transformers must be compensated. For this reason the machine $G_8$ is provided with an excitation winding $P_{81}$ wound about the main pole core proper and a compensation winding $P_{82}$ disposed in the pole faces of auxiliary poles provided between the main poles, both windings having their axes at the centre of the main pole. Because the excitation currents of the transformers vary in a certain proportion to the voltage of the generator $G_7$, the windings $P_{81}$ and $P_{82}$ are preferably included in series with the excitation winding $P_{71}$. To prevent, in loading the system, a part of the load current from being closed through the armature windings of the generator $G_8$, instead of being rectified by the commutator $K_7$, the voltage of the generator $G_8$ must be increased proportionally to the load current. For this reason its main poles are provided with a further winding $Q_{81}$ included in series with the windings $Q_{71}$ and $Q_{72}$ over slip rings 65, 66 and brushes 70, 83 and therefore carrying the load component of the current rectified by means of the commutator $K_7$. The amplitude of the voltage induced by the winding $Q_{81}$ should be such that, upon rectification by means of the commutator $K_7$, said voltage exactly corresponds to the drop of voltage in the circuit $B_{72}$, $Q_{72}$, $Q_{71}$, 65, 70, $Q_{81}$, 83, 66, $B_{71}$. In certain cases an adjustment winding not shown on the drawings may be provided, which winding operates on the principles described in my copending application Serial No. 710,703 filed on the 10th day of February 1934.

It has above been assumed that the voltage of the three phase mains has been transformed in the transformers $T_1$, $T_2$ to a voltage suitable for the auxiliary generator $G_7$, which voltage is retransformed to an amplitude corresponding to the desired direct current voltage. This has, however, the inconvenience that two transformations of the entire effect of the system will have to be made. The same desideratum, that is, the possibility of designing the auxiliary generator independently of the main direct voltage and for the most convenient voltage from the point of view of construction, may also be attained by letting the first transformer group $T_5$, $T_6$ of Figure 20 directly transform the alternating voltage to the high tension required at the commutators $K_1$ to $K_6$. The auxiliary generator $G_9$ operates through the intermedium of transformers $T_{11}$ to $T_{16}$ on the high tension circuits. Said transformers need then only be designed to transfer the auxiliary voltages from the generator $G_9$ to the high tension circuits for which reason said transformers may be made smaller than the transformers $T_3$, $T_4$ in Figures 17 and 18 which have to transfer the entire power of the system. In Figure 20 it has been assumed, for the sake of simplicity, that the compensation winding $Q_{91}$ and the commutation winding $Q_{92}$ are directly included in the high tension circuit between the commutator $K_6$ and the terminal 86. The excitation winding $P_{91}$ and the compensation winding $P_{92}$ intended for the excitation current in the transformers $T_{11}$ to $T_{16}$ are, as mentioned above in connection with the other embodiment, fed from a separate current source 87, 88, by way of example consisting of a rotary converter not shown on the drawings. In this arrangement the windings $S_{91}$ to $S_{96}$ carry a current which is directly proportional to the phase current on the high tension side and inversely proportional to the ratio of transformation of the transformers $T_{11}$ to $T_{16}$. The voltages to be delivered by these armature windings consist of the auxiliary alternating voltages reduced to the primary side of the transformers $T_{11}$ to $T_{16}$. Further the windings $S_{91}$ to $S_{96}$ must deliver excitation currents corresponding to the voltages to be induced in the low tension windings of the transformers $T_{11}$ to $T_{16}$.

Figure 21:
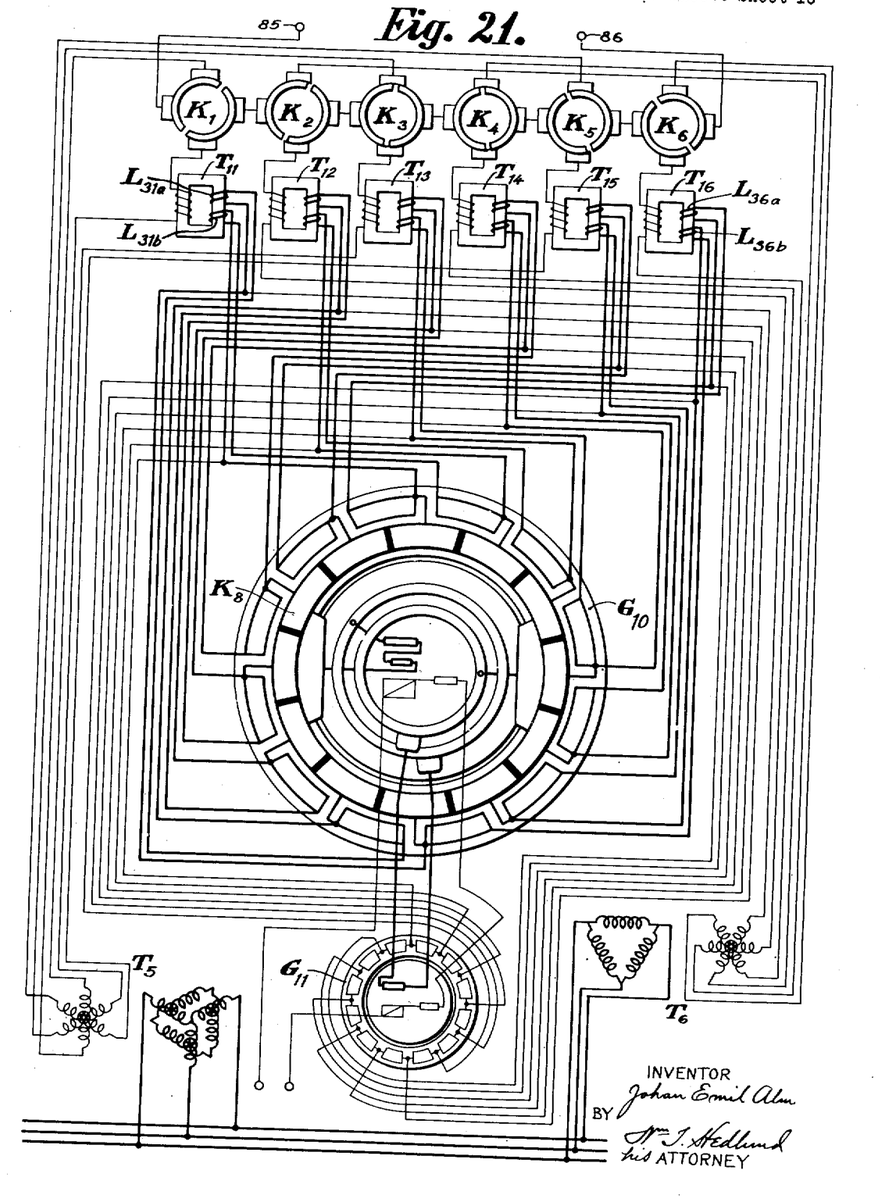

In the simple connection diagram shown in Figure 20 it has been assumed that the high tension direct current is used for feeding the windings $Q_{91}$, $Q_{92}$ which, as mentioned in another connection, may have certain inconveniences. As is shown in Figure 21 it is possible to derive said feeding current according to the same principles as in Figure 18 from an auxiliary commutator $K_8$, the main and auxiliary generators $G_{10}$ and $G_{11}$ being provided, by way of example, with twelve phases which in bipolar machines are connected to twelve segments of the commutator $K_8$ in the same manner as in Figure 18. The primary windings of the transformers $T_{11}$ to $T_{16}$ are in corresponding manner subdivided into two halves $L_{31a}$ to $L_{36a}$ and $L_{31b}$ to $L_{63b}$, the windings having index $a$ being reversed in relation to the windings having index $b$ and the same numerical designation. Through this connection there is obtained the advantage that the high tension circuits associated with the transformers $T_5$, $T_6$, the high tension windings of the transformers $T_{11}$ to $T_{16}$, and the commutators $K_1$ to $K_6$ will be electrically entirely separate from the machine circuits including, inter alia, the rotor and stator of the generator $G_{10}$ and the commutator $K_8$.

Above it has been assumed that two three phase systems have been used which are mutually so arranged that there will be a phase displacement of thirty electrical degrees between consecutive phases. As is readily understood the system may, however, be adapted for any desired number of phases according to principles well known in the art of electrotechnics.

In order to make the disclosure as uniform as possible it has further been assumed that alternating current is converted to direct current.

However, the embodiments herein disclosed may also be used for converting direct current to alternating currents, such as sinusoidal three phase currents, according to well known principles.

Above has been set forth a method to generate, by means of a special auxiliary generator, the necessary auxiliary alternating voltages including the commutation voltages. It is, however, evident that other methods are conceivable for generating the voltages and the invention is therefore not limited to the shown embodiments. The auxiliary alternating voltages proper may, by way of example, be generated by other devices than those causing the commutation voltages. Further other voltage delivering devices than rotating generators may be found suitable.

The commutators may be designed according to the principles set forth in the copending application of Baltzar Carl von Platen, Serial No. 694,930, filed October 24, 1933.

I claim:—

1. A method for the production of direct current from polyphase substantially sinusoidal alternating current which comprises superimposing on each phase of said alternating current an auxiliary alternating voltage having a wave form such that the wave form of the resulting phase voltage is substantially zero during a finite interval, and commutating each phase voltage during said zero interval.

2. A method for the production of direct current from polyphase substantially sinusoidal alternating current which comprises superimposing on each phase of said alternating current an auxiliary alternating voltage having a wave form such that the wave form of the resulting phase voltage is substantially zero during a finite interval, commutating each phase voltage during said zero interval, and composing the different phase voltages thus commutated into a substantially constant voltage.

3. A method for the production of direct current from polyphase substantially sinusoidal alternating current which comprises superimposing on each phase of said alternating current an auxiliary alternating voltage having a wave form such that the wave form of the resulting phase voltage is substantially zero during a finite interval, and at no load is substantially trapezoidal between zero intervals, and commutating each phase voltage during said zero interval.

4. A method for the production of direct current from polyphase substantially sinusoidal alternating current which comprises superimposing on each phase of said alternating current an auxiliary alternating voltage having a wave form such that the wave form of the resulting phase voltage is substantially zero during a finite interval and such that its effect is substantially entirely reactive, and commutating each phase voltage during said zero interval.

5. A method for the production of direct current from polyphase substantially sinusoidal alternating current which comprises superimposing on each phase of said alternating current an auxiliary alternating voltage having a wave form such that the wave form of the resulting phase voltage is substantially zero during a finite interval, superimposing on each phase during the zero interval thereof a commutating auxiliary voltage proportional to the load, and commutating each phase voltage during said zero interval.

6. A method for the production of direct current from polyphase substantially sinusoidal alternating current which comprises superimposing on each phase of said alternating current an auxiliary alternating voltage having a wave form such that the wave form of the resulting phase voltage is substantially zero during a finite interval and at no load is substantially trapezoidal between zero intervals, superimposing on each phase during the zero interval thereof a commutating auxiliary voltage proportional to the load, and commutating each phase voltage during said zero interval.

7. In an electrical system, a plurality of circuits carrying mutually phase displaced voltages of substantially sinusoidal wave form, means for generating and inducing into each of said circuits an auxiliary alternating voltage having a wave form adapted to cause the resulting voltage in each circuit to have finite zero intervals, and means for rectifying the voltage in each circuit during said zero intervals.

8. In an electrical system, a plurality of circuits carrying mutually phase displaced voltages of substantially sinusoidal wave form, means for generating and inducing into each of said circuits an auxiliary alternating voltage having a wave form adapted to cause the resulting voltage in each circuit to have finite zero intervals, means for rectifying the voltage in each circuit during said zero intervals, and means for composing the rectified voltages of the different circuits into a substantially constant unidirectional voltage.

9. In an electrical system, a plurality of circuits carrying mutually phase displaced voltages of substantially sinusoidal wave form, means for generating and inducing into each of said circuits an auxiliary alternating voltage having a wave form adapted to cause the resulting voltage in each circuit to have finite zero intervals and at no load is substantially trapezoidal between zero intervals, and means for rectifying the voltage in each circuit during said voltage intervals.

10. In an electrical system, a plurality of circuits carrying mutually phase displaced voltages of substantially sinusoidal wave form, means for generating and inducing into each of said circuits an auxiliary alternating voltage having a wave form adapted to cause the resulting voltage in each circuit to have finite zero intervals, the effect of said auxiliary voltage being substantially entirely reactive, and means for rectifying the voltage in each circuit during said zero intervals.

11. In an electrical system, a plurality of circuits carrying mutually phase displaced voltages of substantially sinusoidal wave form, means for generating and inducing into each of said circuits an auxiliary alternating voltage having a wave form adapted to cause the resulting voltage in each circuit to have finite zero intervals, means for inducing into each of said circuits during said zero intervals a commutating auxiliary voltage, means for maintaining said commutating auxiliary voltage substantially proportional to the load, and means for rectifying the voltage in each circuit during said zero intervals.

12. In an electrical system, a plurality of circuits carrying mutually phase displaced voltages of substantially sinusoidal wave form, a synchronous generator having distributed induced windings connected to induce an auxiliary voltage in each of said circuits, said auxiliary voltages having a wave form adapted to cause the resulting voltage in each circuit to have finite zero intervals, and commutators associated with each circuit adapted to rectify said voltage during the zero voltage intervals.

13. In an electrical system, a plurality of circuits carrying mutually phase displaced voltages of substantially sinusoidal wave form, a synchronous generator having distributed induced windings connected to induce an auxiliary voltage in each of said circuits and having pole members synchronized with respect to the induced windings so that the centers of said pole members always cooperate with the induced winding associated with the circuit in which the phase voltage is passing through its zero value whereby the auxiliary voltage thus produced has a wave form adapted to cause the resulting voltage in each circuit to have finite zero intervals, and commutators associated with each circuit adapted to rectify said voltages during the zero voltage intervals.

14. In an electrical system, a plurality of circuits carrying mutually phase displaced voltages of substantially sinusoidal wave form, a synchronous generator having distributed induced windings connected to induce an auxiliary voltage in each of said circuits and having pole members synchronized with respect to the induced windings so that the centers of said pole members always cooperate with the induced winding associated with the circuit in which the phase voltage is passing through its zero value, means energizing said pole members in such manner that a plurality of magnetic axes are produced symmetrical with relation to the center of the pole members and with mutually equal and opposite magnetomotive forces whereby the auxiliary voltage thus produced has a wave form adapted to cause the resulting voltage in each circuit to have finite zero intervals, and commutators associated with each circuit adapted to rectify said voltages during the zero voltage intervals.

15. In an electrical system, a plurality of circuits carrying mutually phase displaced voltages of substantially sinusoidal wave form, a synchronous generator having distributed induced windings connected to induce an auxiliary voltage in each of said circuits and having pole members synchronized with respect to the induced windings so that the centers of said pole members always cooperate with the induced winding associated with the circuit in which the phase voltage is passing through its zero value, means energizing said pole members in such manner that four magnetic axes are produced symmetrical with relation to the center of the pole members and with magnetomotive forces of successive axes being equal and opposite whereby the auxiliary voltage thus produced has a wave form adapted to cause the resulting voltage in each circuit to have finite zero intervals, and commutators associated with each circuit adapted to rectify said voltages during the zero voltage intervals.

16. In an electrical system, a plurality of circuits carrying mutually phase displaced voltages of substantially sinusoidal wave form, a synchronous generator having distributed induced windings connected to induce an auxiliary voltage in each of said circuits and having pole members synchronized with respect to the induced windings so that the centers of said pole members always cooperate with the induced winding associated with the circuit in which the phase voltage is passing through its zero value, means energizing said pole members in such manner that four magnetic axes are produced symmetrical with relation to the center of the pole members and with magnetomotive forces of successive axes being opposite and adapted to produce equal flux values whereby the auxiliary voltage thus produced has a wave form adapted to cause the resulting voltage in each circuit to have finite zero intervals, and commutators associated with each circuit adapted to rectify said voltages during the zero voltage intervals.

17. In an electrical system, a plurality of circuits carrying mutually phase displaced voltages of substantially sinusoidal wave form, a synchronous generator having distributed induced windings connected to induce an auxiliary voltage in each of said circuits and having pole members synchronized with respect to the induced windings so that the centers of said pole members always cooperate with the induced winding associated with the circuit in which the phase voltage is passing through its zero value, means energizing said pole members in such manner that a plurality of magnetic axes are produced symmetrical with relation to the center of the pole members, the magnetomotive forces of which are such that said auxiliary voltages are equal and opposite to said sinusoidal voltages whereby the resulting phase voltage has a finite zero interval, and commutators associated with each circuit adapted to rectify said voltages during the zero voltage intervals.

18. In an electrical system, a plurality of circuits carrying mutually phase displaced voltages of substantially sinusoidal wave form, a synchronous generator having distributed induced windings connected to induce an auxiliary voltage in each of said circuits and having pole members synchronized with respect to the induced windings so that the centers of said pole members always cooperate with the induced winding associated with the circuit in which the phase voltages is passing through its zero value, means energizing said pole members in such manner that a plurality of magnetic axes are produced symmetrical with relation to the center of the pole members, the magnetomotive forces of which are such that said auxiliary voltages are equal and opposite to said sinusoidal voltages whereby the resulting phase voltage has a finite zero interval, and commutators associated with each circuit adapted to rectify said voltages during the zero voltage intervals, said magnetic axes being displaced in electrical degrees a distance substantially equal to the duration of said zero interval.

19. In an electrical system, a plurality of circuits carrying mutually phase displaced voltages of substantially sinusoidal wave form, a synchronous generator having distributed induced windings connected to induce an auxiliary voltage in each of said circuits and having pole members synchronized with respect to the induced windings so that the centers of said pole members always cooperate with the induced winding associated with the circuit in which the phase voltage is passing through its zero value whereby the auxiliary voltage thus produced has a wave form adapted to cause the resulting voltage in each circuit to have finite zero intervals, each pole member having a commutation winding energized by direct current proportional to the load, the magnetic axis of said winding coinciding with the center of the pole member, the magnetomotive force of said winding being distributed over an arc not greater than the zero voltage interval, and commutators associated with each circuit adapted to rectify said voltages during the zero voltage intervals.

20. In an electrical system, a plurality of circuits carrying mutually phase displaced voltages of substantially sinusoidal wave form, a synchronous generator having distributed induced windings connected to induce an auxiliary voltage in each of said circuits and having pole members synchronized with respect to the induced windings so that the centers of said pole members always cooperate with the induced winding associated with the circuit in which the phase voltage is passing through its zero value whereby the auxiliary voltage thus produced has a wave form adapted to cause the resulting voltage in each circuit to have finite zero intervals, each pole member having a compensation winding energized by direct current proportional to the load, the magnetic axis of said winding coinciding with the center of the pole member, the magnetomotive force of said winding being substantially equal and opposite the magnetomotive force of the induced windings of a pole pitch, and commutators associated with each circuit adapted to rectify said voltages during the zero voltage intervals.

21. In an electrical system, a plurality of circuits carrying mutually phase displaced voltages of substantially sinusoidal wave form, a synchronous generator having distributed induced windings connected to induce an auxiliary voltage in each of said circuits and having pole members synchronized with respect to the induced windings so that the centers of said pole members always cooperate with the induced winding associated with the circuit in which the phase voltage is passing through its zero value whereby the auxiliary voltage thus produced has a wave form adapted to cause the resulting voltage in each circuit to have finite zero intervals, each pole member having a compensation winding energized by direct current proportional to the load, the magnetic axis of said winding coinciding with the center of the pole member, the magnetomotive force of said winding being substantially equal and opposite the magnetomotive force of the induced windings of a pole pitch, each pole pitch having a further compensation winding, the direct current excitation of which is proportional to the phase voltage and the magnetic axis of which falls between two consecutive pole members, the magnetomotive force caused by said last winding being substantially equal to but opposite the magnetomotive force caused by excitation components which may be present in the induced windings, and commutators associated with each circuit adapted to rectify said voltages during the zero voltage intervals.

22. In an electrical system, a plurality of circuits carrying mutually phase displaced voltages of substantially sinusoidal wave form, a synchronous generator having distributed induced windings connected to induce an auxiliary voltage in each of said circuits and having an excitation winding, a rotary converter operated by voltage proportional to the voltage in said circuits and adapted to supply direct current to said excitation winding, said auxiliary voltages having a wave form adapted to cause the resulting voltage in each circuit to have finite zero intervals, and commutators associated with each circuit adapted to rectify said voltages during the zero intervals.

23. In an electrical system, a plurality of circuits carrying mutually phase displaced voltages of substantially sinusoidal wave form, a synchronous generator having distributed induced windings connected to induce an auxiliary voltage in each of said circuits and having excitation means, said auxiliary voltages having a wave form adapted to cause the resulting voltage in each circuit to have finite zero intervals, commutators associated with each circuit adapted to rectify said voltages during the zero intervals, and means to compensate said excitation means in accordance with impulses caused by incorrect commutation.

JOHAN EMIL ALM.